(12) United States Patent
Paleczny

(10) Patent No.: US 8,552,997 B2
(45) Date of Patent: Oct. 8, 2013

(54) PORTABLE ELECTRONIC DEVICE INCLUDING TACTILE TOUCH-SENSITIVE INPUT DEVICE

(75) Inventor: Todd Robert Paleczny, Heidelberg (CA)

(73) Assignee: Blackberry Limited, Waterloo (CA)

( * ) Notice: Subject to any disclaimer, the term of this patent is extended or adjusted under 35 U.S.C. 154(b) by 449 days.

(21) Appl. No.: 12/766,545

(22) Filed: Apr. 23, 2010

(65) Prior Publication Data
US 2011/0260984 A1   Oct. 27, 2011

(51) Int. Cl.
*G06F 3/041* (2006.01)
(52) U.S. Cl.
USPC .................................. 345/173; 340/407.2
(58) Field of Classification Search
USPC ........................... 345/173–182; 340/407.2
See application file for complete search history.

(56) References Cited

U.S. PATENT DOCUMENTS

| | | | |
|---|---|---|---|
| 5,245,245 | A | 9/1993 | Goldenberg |
| 6,429,846 | B2 | 8/2002 | Rosenberg et al. |
| 7,148,875 | B2 | 12/2006 | Rosenberg et al. |
| 7,468,573 | B2 | 12/2008 | Dai et al. |
| 2003/0011282 | A1 | 1/2003 | Kishimoto |
| 2004/0233174 | A1* | 11/2004 | Robrecht et al. ............. 345/173 |
| 2006/0119586 | A1 | 6/2006 | Grant et al. |
| 2006/0209037 | A1 | 9/2006 | Wang et al. |
| 2008/0060856 | A1* | 3/2008 | Shahoian et al. .......... 178/18.03 |
| 2008/0062145 | A1 | 3/2008 | Shahoian et al. |
| 2008/0100177 | A1 | 5/2008 | Dai et al. |
| 2009/0007758 | A1 | 1/2009 | Schlosser et al. |
| 2009/0189873 | A1* | 7/2009 | Peterson et al. ............. 345/173 |
| 2010/0013777 | A1 | 1/2010 | Baudisch et al. |

FOREIGN PATENT DOCUMENTS

DE   19845134 A1   4/2000

OTHER PUBLICATIONS

An Office Action dated Jan. 31, 2011 issued in respect of the corresponding EP application.
Extended European Search Report dated Sep. 29, 2010, issued from the corresponding European patent application.
www.piezo.com/prodbm0nav.html, Published on internet as least as early as Mar. 12, 2009.
An Examiner's Report dated Jun. 6, 2013 issued in respect of the corresponding CA application No. 2,733,375.

* cited by examiner

*Primary Examiner* — Kevin M Nguyen
*Assistant Examiner* — Kenneth B Lee, Jr.
(74) *Attorney, Agent, or Firm* — Geoffrey deKleine; Borden Ladner Gervais LLP

(57) ABSTRACT

An electronic device includes a base, a touch-sensitive input surface spaced from and moveable relative to the base, and an actuating arrangement between the base and the touch-sensitive input surface. The actuating arrangement is arranged to vary a force on the touch-sensitive input surface in response to detection of a touch event on the touch-sensitive input surface. The actuating arrangement includes an actuator including a piezoelectric disk coupled to a substrate that includes an elastically deformable truncated disk.

10 Claims, 9 Drawing Sheets

PORTABLE ELECTRONIC DEVICE INCLUDING TACTILE TOUCH-SENSITIVE INPUT DEVICE

FIELD OF TECHNOLOGY

The present disclosure relates to portable electronic devices that include a touch-sensitive input device and the provision of tactile feedback for such input devices.

BACKGROUND

Electronic devices, including portable electronic devices, have gained widespread use and can provide a variety of functions including, for example, telephonic, electronic messaging and other personal information manager (PIM) application functions. Portable electronic devices can include several types of devices including mobile stations such as cellular phones, smart phones, Personal Digital Assistants (PDAs), and laptop computers. Touch-sensitive input devices are useful for input on a portable electronic device.

Devices such as PDAs or smart phones are generally intended for handheld use and ease of portability. Smaller devices are generally desirable for portability. Touch screen devices constructed of a display, such as a liquid crystal display (LCD), with a touch-sensitive overlay are useful on such handheld devices as such handheld devices are small and are therefore limited in space available for user input and output devices. Further, the screen content on the touch screen devices can be modified depending on the functions and operations being performed.

Touch-sensitive input devices suffer from inherent disadvantages relating to user interaction and response. In particular, errors may be made in selecting features using touch-sensitive input devices such as double entry during selection as a result of a lack of touch feedback. While touch screen devices that provide feedback such as audio feedback are known, such devices do not provide a desirable tactile feedback. Further improvements in provision and control of tactile feedback in touch-sensitive devices are desirable.

BRIEF DESCRIPTION OF THE DRAWINGS

Embodiments of the present disclosure will now be described, by way of example only, with reference to the attached Figures, wherein.

DETAILED DESCRIPTION

Figure 1:
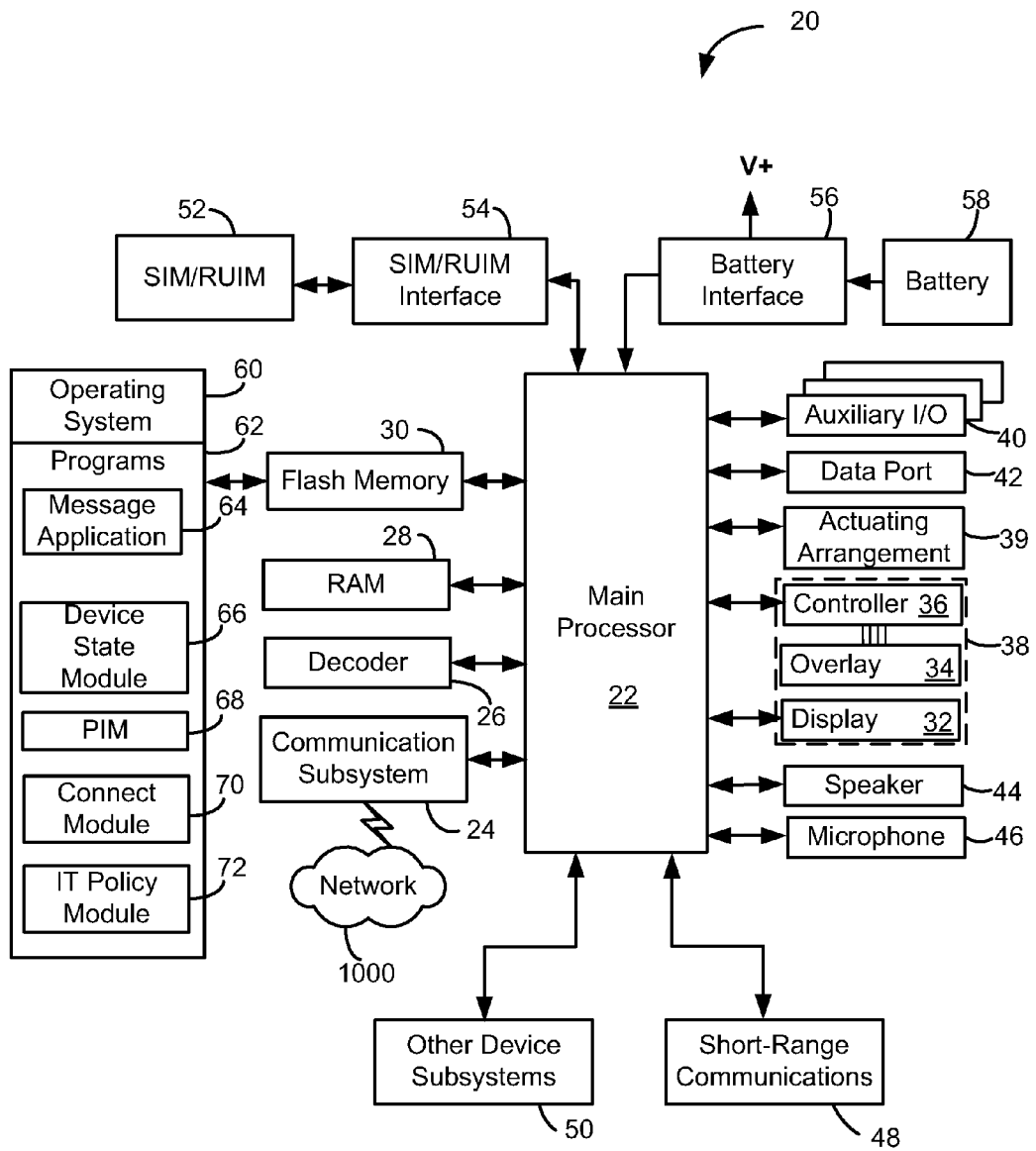
FIG. 1 is a simplified block diagram of an example of a portable electronic device in accordance with the present disclosure.

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limited to the scope of the embodiments described herein.

The disclosure generally relates to an electronic device, which in the embodiments described herein is a portable electronic device. Examples of portable electronic devices include mobile, or handheld, wireless communication devices such as pagers, cellular phones, cellular smart phones, personal organizers, PDAs, notebook computers and the like.

The portable electronic device may be a two-way communication device with advanced data communication capabilities including the capability to communicate with other portable electronic devices or computer systems through a network of transceiver stations. The portable electronic device may also have the capability to allow voice communication. Depending on the functionality provided by the portable electronic device, it may be referred to as a data messaging device, a two-way pager, a cellular telephone with data messaging capabilities, a wireless Internet appliance, or a data communication device (with or without telephony capabilities). The portable electronic device may also be a portable device without wireless communication capabilities.

Referring to FIG. 1, there is shown therein a block diagram of an example of a portable electronic device 20. The portable electronic device 20 includes a number of components such as the processor 22 that controls the overall operation of the portable electronic device 20. Communication functions, including data and voice communications, are performed through a communication subsystem 24. Data received by the portable electronic device 20 can be decompressed and decrypted by a decoder 26, operating according to any suitable decompression techniques (e.g. YK decompression, and other known techniques) and encryption techniques (e.g. using an encryption technique such as Data Encryption Standard (DES), Triple DES, or Advanced Encryption Standard (AES)). The communication subsystem 24 receives messages from and sends messages to a wireless network 1000. In this example of the portable electronic device 20, the communication subsystem 24 is configured in accordance with the Global System for Mobile Communication (GSM) and General Packet Radio Services (GPRS) standards. The GSM/GPRS wireless network is used worldwide and it is expected that these standards will be superseded eventually by Enhanced Data GSM Environment (EDGE) and Universal Mobile Telecommunications Service (UMTS). New standards are still being defined, but it is believed that they will have similarities to the network behavior described herein, and it will also be understood by persons skilled in the art that the embodiments described herein are intended to use any other suitable standards that are developed in the future. The wireless link connecting the communication subsystem 24 with the wireless network 1000 represents one or more different Radio Frequency (RF) channels, operating according to defined protocols specified for GSM/GPRS communications. With newer network protocols, these channels are capable of supporting both circuit switched voice communications and packet switched data communications.

Although the wireless network 1000 associated with the portable electronic device 20 is a GSM/GPRS wireless network in one example of an implementation, other wireless networks may also be associated with the portable electronic device 20 in variant implementations. The different types of wireless networks that may be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks (as mentioned above), and future third-generation (3G) networks like EDGE and UMTS. Some other examples of data-centric networks include WiFi 802.11, Mobitex™ and DataTAC™ network communication systems. Examples of other voice-centric data networks include Personal Communication Systems (PCS) networks like GSM and Time Division Multiple Access (TDMA) systems.

The processor 22 also interacts with additional subsystems such as a Random Access Memory (RAM) 28, a flash memory 30, a display 32 with a touch-sensitive input surface in the form of a touch-sensitive overlay 34 connected to an electronic controller 36 that together make up a touch screen display 38, an auxiliary input/output (I/O) subsystem 40, a data port 42, a speaker 44, a microphone 46, short-range communications 48 and other device subsystems 50. The touch-sensitive overlay 34 and the electronic controller 36 provide a touch-sensitive input device and the processor 22 interacts with the touch-sensitive overlay 34 via the electronic controller 36. An actuating arrangement 39 is connected to and communicates with the processor 22.

Some of the subsystems of the portable electronic device 20 perform communication-related functions, whereas other subsystems may provide "resident" or on-device functions. By way of example, the display 32 and the touch-sensitive overlay 34 may be used for both communication-related functions, such as entering a text message for transmission over the network 1000, and device-resident functions such as a calculator or task list.

The portable electronic device 20 can send and receive communication signals over the wireless network 1000 after network registration or activation procedures have been completed. Network access is associated with a subscriber or user of the portable electronic device 20. To identify a subscriber according to the present embodiment, the portable electronic device 20 uses a SIM/RUIM card 52 (i.e. Subscriber Identity Module or a Removable User Identity Module) inserted into a SIM/RUIM interface 54 for communication with a network such as the network 1000. The SIM/RUIM card 52 is one type of a conventional "smart card" that can be used to identify a subscriber of the portable electronic device 20 and to personalize the portable electronic device 20, among other things. In the present embodiment the portable electronic device 20 is not fully operational for communication with the wireless network 1000 without the SIM/RUIM card 52. By inserting the SIM/RUIM card 52 into the SIM/RUIM interface 54, a subscriber can access all subscribed services. Services may include: web browsing and messaging such as e-mail, voice mail, Short Message Service (SMS), and Multimedia Messaging Services (MMS). More advanced services may include: point of sale, field service and sales force automation. The SIM/RUIM card 52 includes a processor and memory for storing information. Once the SIM/RUIM card 52 is inserted into the SIM/RUIM interface 54, it is coupled to the processor 22. In order to identify the subscriber, the SIM/RUIM card 52 can include some user parameters such as an International Mobile Subscriber Identity (IMSI). An advantage of using the SIM/RUIM card 52 is that a subscriber is not necessarily bound by any single physical portable electronic device. The SIM/RUIM card 52 may store additional subscriber information for a portable electronic device as well, including datebook (or calendar) information and recent call information. Alternatively, user identification information can also be programmed into the flash memory 30.

The portable electronic device 20 is a battery-powered device and includes a battery interface 56 for receiving one or more rechargeable batteries 58. In at least some embodiments, the battery 58 can be a smart battery with an embedded microprocessor. The battery interface 56 is coupled to a regulator (not shown), which assists the battery 58 in providing power V+ to the portable electronic device 20. Although current technology makes use of a battery, future technologies such as micro fuel cells may provide the power to the portable electronic device 20.

The portable electronic device 20 also includes an operating system 60 and software components 62 which are described in more detail below. The operating system 60 and the software components 62 that are executed by the processor 22 are typically stored in a persistent store such as the flash memory 30, which may alternatively be a read-only memory (ROM) or similar storage element (not shown). Those skilled in the art will appreciate that portions of the operating system 60 and the software components 62, such as specific software applications 64, 66, 68, 70 and 72, or parts thereof, may be temporarily loaded into a volatile store such as the RAM 28. Other software components can also be included, as is well known to those skilled in the art.

The subset of software components 62 that control basic device operations, including data and voice communication applications, will normally be installed on the portable electronic device 20 during manufacture of the portable electronic device 20. Other software applications include a message application 64 that can be any suitable software program that allows a user of the portable electronic device 20 to send and receive electronic messages. Various alternatives exist for the message application 64 as is well known to those skilled in the art. Messages that have been sent or received by the user are typically stored in the flash memory 30 of the portable electronic device 20 or some other suitable storage element in the portable electronic device 20. In at least some embodiments, some of the sent and received messages may be stored remotely from the device 20 such as in a data store of an associated host system that the portable electronic device 20 communicates with.

The software components 62 can further include a device state module 66, a Personal Information Manager (PIM) 68, and other suitable modules (not shown). The device state module 66 provides persistence, i.e. the device state module 66 ensures that important device data is stored in persistent memory, such as the flash memory 30, so that the data is not lost when the portable electronic device 20 is turned off or loses power.

The PIM 68 includes functionality for organizing and managing data items of interest to the user, such as, but not limited to, e-mail, contacts, calendar events, voice mails, appointments, and task items. The PIM 68 has the ability to send and receive data items via the wireless network 1000. PIM data items may be seamlessly integrated, synchronized, and updated via the wireless network 1000 with the portable electronic device subscriber's corresponding data items stored and/or associated with a host computer system. This functionality creates a mirrored host computer on the portable electronic device 20 with respect to such items. This can be particularly advantageous when the host computer system is the portable electronic device subscriber's office computer system.

The software components 62 also includes a connect module 70, and an information technology (IT) policy module 72. The connect module 70 implements the communication protocols that are required for the portable electronic device 20 to communicate with the wireless infrastructure and any host system, such as an enterprise system, that the portable electronic device 20 is authorized to interface with.

The connect module 70 includes a set of APIs that can be integrated with the portable electronic device 20 to allow the portable electronic device 20 to use any number of services associated with the enterprise system. The connect module 70 allows the portable electronic device 20 to establish an end-to-end secure, authenticated communication pipe with the host system. A subset of applications for which access is provided by the connect module 70 can be used to pass IT policy commands from the host system to the portable electronic device 20. This can be done in a wireless or wired manner. These instructions can then be passed to the IT policy module 72 to modify the configuration of the device 20. Alternatively, in some cases, the IT policy update can also be done over a wired connection.

Other types of software applications can also be installed on the portable electronic device 20. These software applications can be third party applications, which are added after the manufacture of the portable electronic device 20. Examples of third party applications include games, calculators, utilities, etc.

The additional applications can be loaded onto the portable electronic device 20 through at least one of the wireless network 1000, the auxiliary I/O subsystem 40, the data port 42, the short-range communications subsystem 48, or any other suitable device subsystem 50. This flexibility in application installation increases the functionality of the portable electronic device 20 and may provide enhanced on-device functions, communication-related functions, or both. For example, secure communication applications may enable electronic commerce functions and other such financial transactions to be performed using the portable electronic device 20.

The data port 42 enables a subscriber to set preferences through an external device or software application and extends the capabilities of the portable electronic device 20 by providing for information or software downloads to the portable electronic device 20 other than through a wireless communication network. The alternate download path may, for example, be used to load an encryption key onto the portable electronic device 20 through a direct and thus reliable and trusted connection to provide secure device communication.

The data port 42 can be any suitable port that enables data communication between the portable electronic device 20 and another computing device. The data port 42 can be a serial or a parallel port. In some instances, the data port 42 can be a USB port that includes data lines for data transfer and a supply line that can provide a charging current to charge the battery 58 of the portable electronic device 20.

The short-range communications subsystem 48 provides for communication between the portable electronic device 20 and different systems or devices, without the use of the wireless network 1000. For example, the short-range communications subsystem 48 may include an infrared device and associated circuits and components for short-range communication. Examples of short-range communication standards include standards developed by the Infrared Data Association (IrDA), Bluetooth, and the 802.11 family of standards developed by IEEE.

In use, a received signal such as a text message, an e-mail message, or web page download is processed by the communication subsystem 24 and input to the processor 22. The processor 22 then processes the received signal for output to the display 32 or alternatively to the auxiliary I/O subsystem 40. A subscriber may also compose data items, such as e-mail messages, for example, using the touch-sensitive overlay 34 on the display 32 that are part of the touch screen display 38, and possibly the auxiliary I/O subsystem 40. The auxiliary subsystem 40 may include devices such as: a mouse, track ball, infrared fingerprint detector, or a roller wheel with dynamic button pressing capability. A composed item may be transmitted over the wireless network 1000 through the communication subsystem 24.

For voice communications, the overall operation of the portable electronic device 20 is substantially similar, except that the received signals are output to the speaker 44, and signals for transmission are generated by the microphone 46. Alternative voice or audio I/O subsystems, such as a voice message recording subsystem, can also be implemented on the portable electronic device 20. Although voice or audio signal output is accomplished primarily through the speaker 44, the display 32 can also be used to provide additional information such as the identity of a calling party, duration of a voice call, or other voice call related information.

Figure 2:
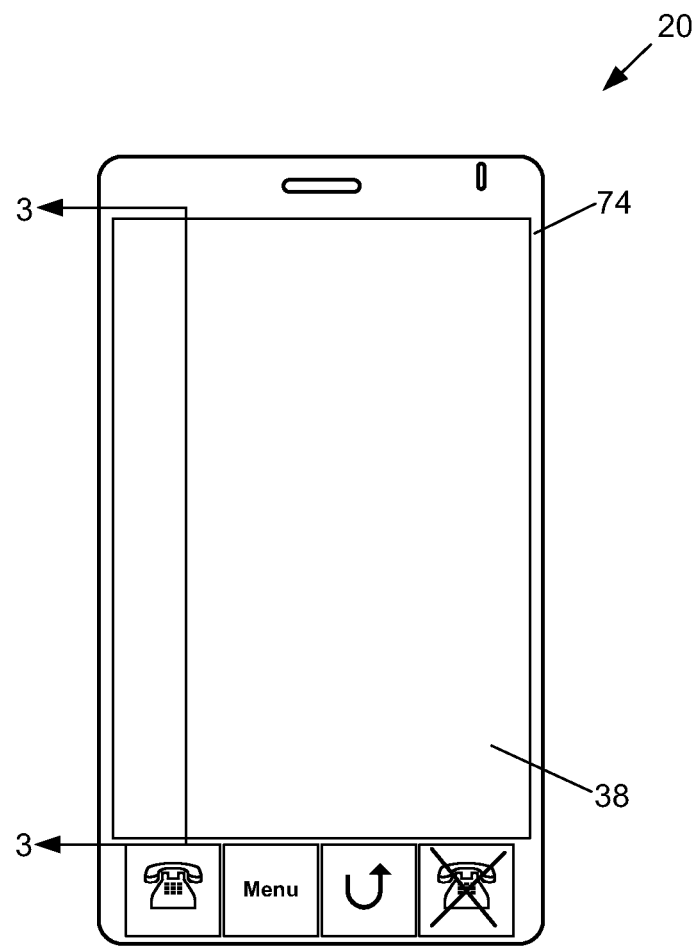
FIG. 2 is a front view of an example of a portable electronic device in a portrait orientation.

FIG. 2 shows a front view of an example of a portable electronic device 20 in portrait orientation. The portable electronic device 20 includes a housing 74 that houses the internal components that are shown in FIG. 1 and frames the touch screen display 38 such that a surface of the touch screen display 38 is exposed for user-interaction therewith when the portable electronic device 20 is in use.

The touch screen display 38 may be any suitable touch screen display such as a capacitive touch screen display. A capacitive touch screen display includes the display 32 and the touch-sensitive overlay 34, as shown in FIG. 1, in the form of a capacitive touch-sensitive overlay. The capacitive touch-sensitive overlay 34 includes a number of layers in a stack and is fixed to the display 32 via a suitable adhesive. The layers can include, for example a substrate fixed to the LCD display 32 by a suitable adhesive, a ground shield layer, a barrier layer, a pair of capacitive touch sensor layers separated by a substrate or other barrier layer, and a cover layer fixed to the second capacitive touch sensor layer by a suitable adhesive. The capacitive touch sensor layers can be any suitable material such as patterned indium tin oxide (ITO).

In the example of a capacitive touch screen display, the X and Y location of a touch event are both determined with the X location determined by a signal generated as a result of capacitive coupling with one of the touch sensor layers and the Y location determined by the signal generated as a result of capacitive coupling with the other of the touch sensor layers. Each of the touch-sensor layers provides a signal to the controller 36 as a result of capacitive coupling with a suitable object, such as a finger of a user, resulting in a change in the electric field of each of the touch sensor layers. The signals represent the respective X and Y touch location values. It will be appreciated that other attributes of the user's touch on the touch screen display 38 may be determined. For example, the size and the shape of the touch on the touch screen display 38 may be determined in addition to the location (X and Y values) based on the signals received at the controller 36 from the touch sensor layers.

Referring still to FIG. 2, it will be appreciated that a user's touch on the touch screen display 38 is determined by determining the X and Y touch location and user-selected input is determined based on the X and Y touch location and the application executed by the processor 22. Thus a feature such as a virtual button displayed on the touch screen display 38 may be selected by matching the feature to the X and Y location of a touch event on the touch screen display 38. A feature selected by the user is determined based on the X and Y touch location and the application.

Figure 3A:
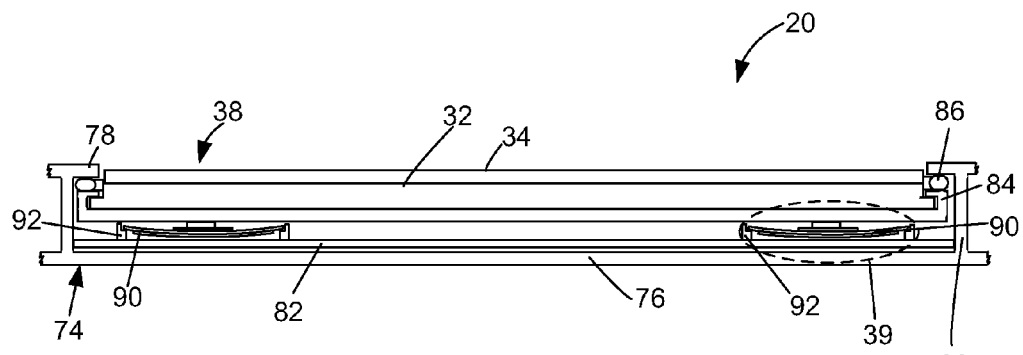
FIG. 3A is a sectional side view of portions of the touch screen display unit of FIG. 2.
Figure 3B:
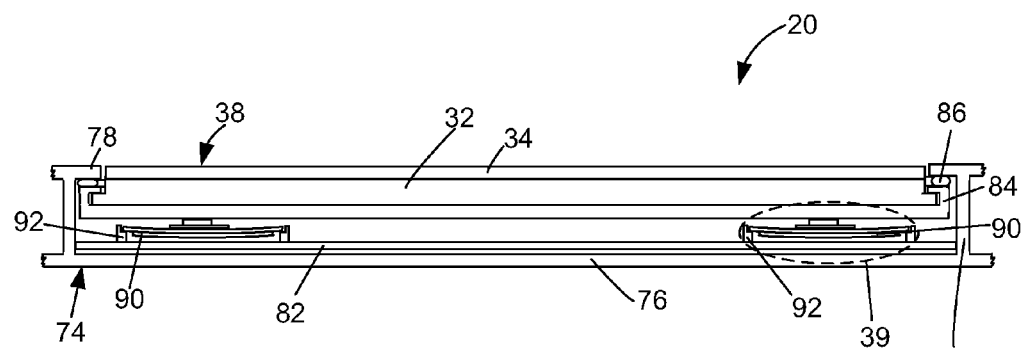
FIG. 3B is a sectional side view of portions of the touch screen display unit of FIG. 2.

The housing 74 may be any suitable housing for the internal components shown in FIG. 1. As best shown in FIGS. 3A and 3B, the housing 74 in the present example includes a back 76, a frame 78, which frames the touch screen display 38 and sidewalls 80 that extend between and generally perpendicular to the back 76 and the frame 78. A base 82 is spaced from and is generally parallel to the back 76. The base 82 can be any suitable base and can include, for example, a printed circuit board or flex circuit board supported by a stiff support. The back 76 includes a plate (not shown) that is releasably attached for insertion and removal of, for example, the battery 58 and the SIM/RUIM card 52 described above. It will be appreciated that the back 76, the sidewalls 80 and the frame 78 can be injection molded, for example. In the example of the portable electronic device 20 shown in FIG. 2, the frame 78 is generally rectangular with rounded corners although other shapes are possible.

The display 32 and the touch-sensitive overlay 34 are supported on a support tray 84 of suitable material such as magnesium for providing mechanical support to the display 32 and touch-sensitive overlay 34. A compliant gasket 86 is located around the perimeter of the frame 78, between an upper portion of the support tray 84 and the frame 78 to protect the components housed in the housing 74 of the portable electronic device 20. A suitable material for the compliant gasket 86 includes, for example, a cellular urethane foam for providing shock absorption, vibration damping and a suitable fatigue life. The cellular urethane foam may be used to pre-load the piezo actuator. The touch screen display 38 is moveable within the housing 74 as the touch screen display 38 may be moved away from the base 82, thereby compressing the compliant gasket 86. The touch screen display 38 may also be moved toward the base 82, thereby applying a force to the elements 88 referred to below. FIGS. 3A and 3B show exaggerated movement of the touch screen display 38. FIG. 3A shows the touch screen display 38 with an external applied force, for example, applied by a user's finger during a touch event. The actuating arrangement 39 is not actuated in FIG. 3A. FIG. 3B shows the touch screen display 38 with the actuating arrangement 39 actuated during a touch event.

Figure 3C:
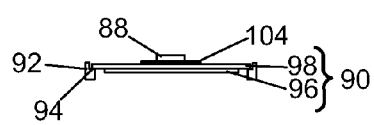
FIG. 3C is a side view of a portion of the portable electronic device of FIG. 2 according to one embodiment.
Figure 3D:
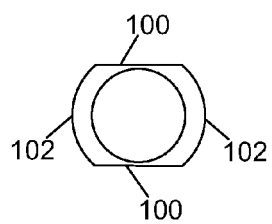
FIG. 3D is a rear view of a piezo actuator of FIG. 3C, according to one embodiment.

In the present example, the actuating arrangement 39 includes four piezo actuators 90, with each piezo actuator 90 supported on respective pairs of curved supports 92 in the shape of segments of a hollow cylinder. Each pair of curved supports 92 extend from the base 82 toward the touch screen display 38 and each of the curved supports 92 includes an inside step 94 for supporting a respective piezo actuator 90 while permitting flexing of the piezo actuator 90. As best shown in FIG. 3C, each piezo actuator 90 includes a piezoelectric disk 96 such as a PZT ceramic disk adhered to a substrate 98. As best shown in FIG. 3D, the substrate 98 is a metal disk—that is truncated on each side of a diameter thereof such that the substrate 98 includes opposing parallel sides 100 and opposing arcuate sections 102 that extend between the opposing parallel sides 100. The arcuate sections 102 are concentric and are equal in radius. The radius of the arcuate sections 102 is greater than the radius of the piezoelectric disk 96. Further, the width of the substrate 98, between parallel sides 100, is greater than the diameter of the piezoelectric disk 96 such that an entire side of the piezoelectric disk 96 is adjacent and adhered to the substrate 98.

The piezo actuator 90 may be constructed by truncating the metal disk substrate 98 to provide the opposing parallel sides 100. The metal disk substrate 98 may be truncated utilizing a suitable metalworking process such as a blanking or other punching process. The metal disk substrate 98 has a greater diameter than the piezoelectric disk 96. The piezoelectric disk 96 is adhered to the surface of the truncated metal disk substrate 98.

Each piezo actuator 90 is supported on the respective supports 92 on one side of the base 82, near a respective corner of the housing 74 with the arcuate sections 102 of the substrate 98 seated on the inside step 94 of a respective one of the pair of curved supports 92 such that the supports 92 support the piezo actuators 90 and permit flexing of each piezo actuator 90. An element 88, which in the present example is partially flexible and comprises, for example, hard rubber, is located between the piezo actuator 90 and the support tray 84. The element 88 does not substantially dampen the force of the piezo actuators 90 on the touch screen display 38 and, similarly, does not substantially dampen the force of the touch screen display 38 on force sensors 104. The force sensors 104 are located between each element 88 and the respective piezo actuator 90. A suitable force sensor 104 includes, for example, a puck-shaped force sensing resistor for measuring applied force (or pressure). A force may be determined using a force sensing resistor as an increase in pressure on the force sensing resistor results in a decrease in resistance (or increase in conductance). In the portable electronic device 20, each piezo actuator 90 is located between the base 82 and the support tray 84 and force may be applied on each piezo actuator 90 by the touch screen display 38, in the direction of the base 82, causing bending of the piezo actuator 90. Thus, absent an external force applied by a user, for example by pressing on the touch screen display 38, and absent a charge on the piezo actuator 90, the piezo actuator 90 undergoes slight bending, therefore pre-loading the piezo actuator 90. An external applied force caused by a user pressing on the touch screen display 38 during a touch event, and prior to actuation of the piezo actuator 90, causes increased bending of the piezo actuator 90, as shown in FIG. 3A and the piezo actuator 90 applies a spring force against the touch screen display 38.

Each piezoelectric disk 96 contracts diametrically as a result of build up of charge at the piezoelectric disk 96. As described, each piezoelectric disk 96 is adhered to a substrate 98 and both the substrate 98 and the piezoelectric disk 96 bend as a result of the diametric contraction of the piezoelectric disk 96 such that a force is applied on the support tray 84 in the direction away from the base 82. With the substrate 98 truncated as described, bending of the substrate 98 is less constrained thereby increasing the force applied to the support tray 84 in the direction away from the base by comparison to a non-truncated disk substrate.

The force applied by the piezo actuator 90 on the support tray 84 opposes the external applied force on the touch screen display 38. Thus, the bending force on the substrate 98, caused by the piezoelectric disk 96 shrinking diametrically, is opposed by the external applied force during the touch on the touch screen display 38. In the present example, when the piezoelectric disk 96 is charged, the piezo actuator 90 opposes the applied force on the touch screen display 38 and straightens, as shown in FIG. 3B.

Each of the piezo actuators 90, elements 88 and force sensors 104 are supported on the respective pair of curved supports 92 on one side of the base 82. The curved supports 92 can be part of the base 82 or can be supported on the base 82. Each piezo actuator 90 is located between the base 82 and the support tray 84 such that an external applied force on the touch screen display 38 resulting from a user pressing the touch screen display 38 can be measured by the force sensors 104 and such that the charging of the piezo actuator 90 causes a force on the touch screen display 38, away from the base 82 as described above.

Each piezo actuator 90 is in contact with the support tray 84. Thus, depression of the touch screen display 38 by user application of a force thereto is determined by a change in resistance at the force sensors 104 and causes further bending of the piezo actuators 90 as shown in FIG. 3A. Further, the charge on the piezo actuator 90 can be varied to control the force applied by the piezo actuator 90 on the support tray 84 and the resulting movement of the touch screen display 38. The charge can be varied by varying the applied voltage or current. For example, a current can be applied to increase the charge on the piezo actuator 90 to contract the piezoelectric disk 96 as described above, causing the metal substrate 98 and the piezoelectric disk 96 to straighten as referred to above. This charge therefore results in the force on the touch screen display 38, opposing the external applied force and movement of the touch screen display 38 away from the base 82, as shown in FIG. 3B. The charge on the piezo actuator 90 can also be removed via a controlled discharge current causing the piezoelectric disk 96 to expand again, releasing the force caused by the electric charge and thereby decreasing the force on the touch screen display 38, permitting the touch screen display to return to a rest position. The movement of the touch screen display 38 and the flexing of the piezo actuators 90 is exaggerated in FIGS. 3A and 3B for the purpose of illustration.

Figure 5:
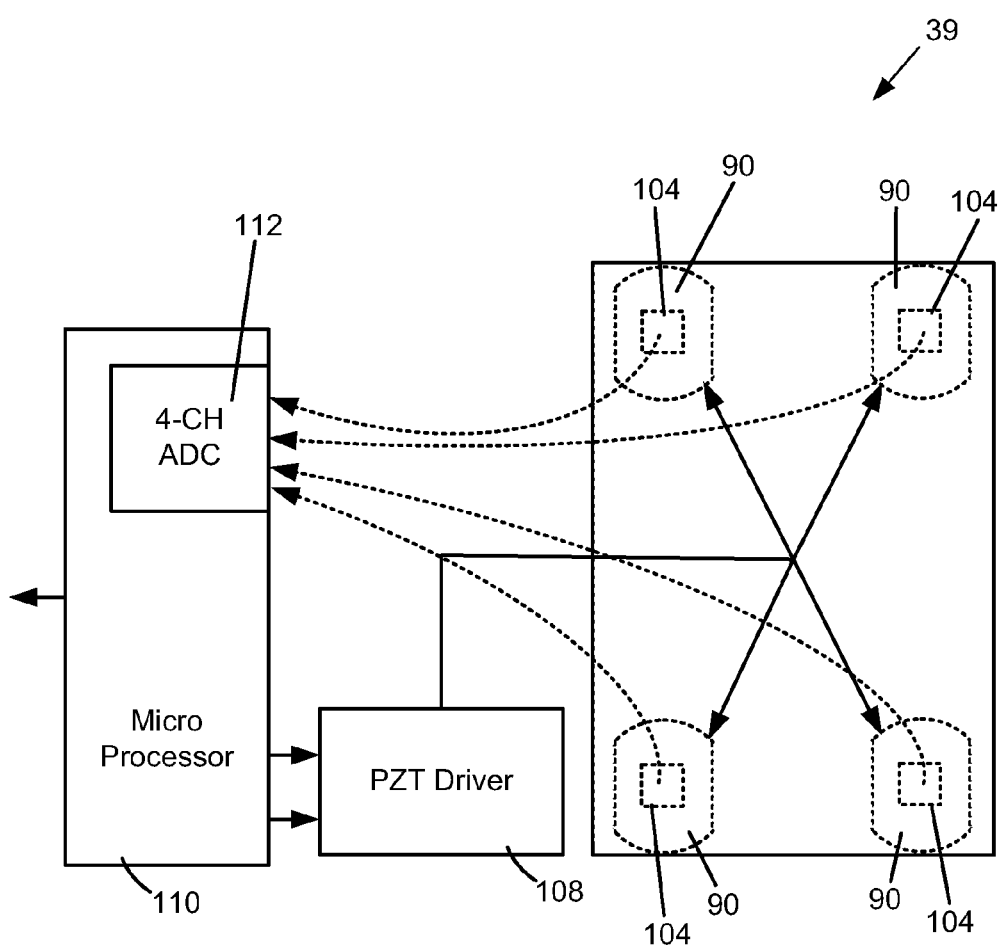
FIG. 5 is a functional block diagram of an actuating arrangement of the portable electronic device.

FIG. 5 shows the actuating arrangement 39 according to one embodiment. As shown, each of the piezoelectric disks 96 is connected to a piezo driver 108 that communicates with a microprocessor 110 including a four-channel amplifier and analog-to-digital converter 112 that is connected to each of the force sensors 104. The microprocessor 110 is also in communication with the main processor 22 of the portable electronic device 20. The microprocessor 110 can provide signals to the main processor 22 of the portable electronic device 20. The piezo driver 108 can be embodied in drive circuitry between the microprocessor 110 and the piezoelectric disks 96.

The mechanical work performed by the piezo actuator 90 can be controlled to provide generally consistent force and movement of the touch screen display 38 in response to detection of an applied force on the touch screen display 38 in the form of a touch, for example. Fluctuations in mechanical work performed as a result of, for example, temperature, can be reduced by varying the current to control the charge. Each piezoelectric disk 96 has similar electrical properties to a capacitor. The mechanical work performed (force*displacement) by the peizo disk actuator 90 can be controlled by controlling the charge, expressed as:

$$Q_{piezo} = C_{piezo} * V_{piezo}$$

where:

Q is charge;

C is capacitance; and

V is voltage.

A coefficient, referred to as the D31 coefficient of a piezoelectric material composition provides the relationship between voltage and force. The D31 coefficient and the relative dielectric constant, (Er) of a given piezoelectric material composition vary inversely with temperature, however. Therefore, if the charge at the piezoelectric disk 96 is controlled within a small range, the variance of the mechanical work of the piezo actuator 90 can be small. The current can be controlled as the current flowing in or out of a capacitor (which has similar electrical properties to the piezoelectric disk 96) is given by:

$$I = C * dV/dT$$

where

I is current;

C is capacitance; and dV/dT is differential voltage or instantaneous rate of voltage change.

With I and dT held constant, then as C decreases, dV increases. Thus the charge is controlled since $Q_{piezo} = C_{piezo} * V_{piezo}$.

The microprocessor 110 controls the PZT driver 108 for controlling the current to the piezoelectric disks 96 and thereby controlling the charge, increasing the charge to increase the force on the touch screen display 38 away from the base 82 and decreasing the charge to decrease the force on the touch screen display 38, permitting the touch screen display 38 to move toward the base 82. In the present example, each of the piezo actuators 90 are connected to the microprocessor 110 through the piezo driver 108 and are all controlled equally and concurrently. The piezo actuators 90 may be controlled separately, however.

Figure 4:
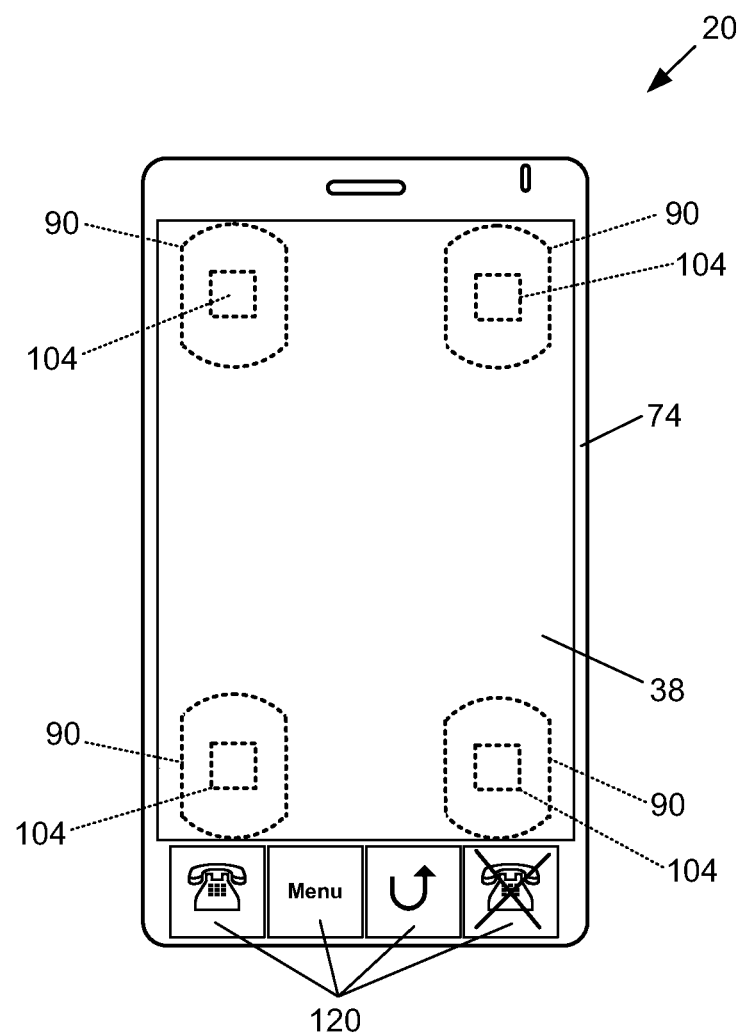
FIG. 4 is a front view of an example of a portable electronic device in a portrait orientation, showing hidden detail in ghost outline.

In the present example, the piezo actuators 90 are each located near a respective corner of the touch screen display 38, as shown in FIG. 4. The portable electronic device 20 may also include physical buttons such as the four physical buttons 120, shown in FIG. 4, for user-selection for performing functions or operations. Further buttons for performing further functions on the portable electronic device of FIG. 4 may be virtual features rendered on the touch screen display 38.

The portable electronic device 20 is controlled generally by monitoring the touch screen display 38 for a touch event thereon, and varying a force on the touch screen display 38, in response to detection of a touch event. The force is applied by at least one of the piezo actuators 90, in a single direction on the touch-sensitive input surface of the touch screen display 38.

Figure 6:
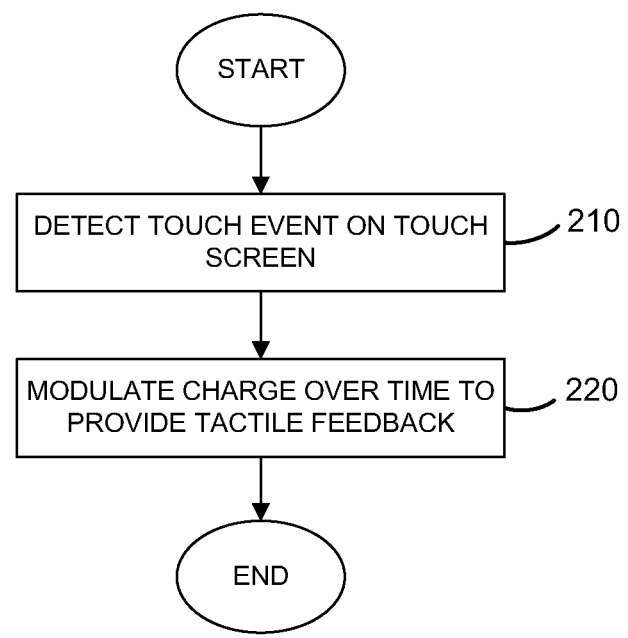
FIG. 6 is a flow-chart illustrating a method of controlling a portable electronic device including a touch-sensitive input surface according to an embodiment.

Reference is made to FIG. 6 to describe a method of controlling a portable electronic device in accordance with one embodiment. It will be appreciated that the steps of FIG. 6 can be carried out by routines or subroutines of software executed by, for example, the microprocessor 110. Coding of software for carrying out such steps is well within the scope of a person of ordinary skill in the art having regard to the present description.

The method starts with, for example, the portable electronic device 20 in an on or awake state. The touch-sensitive input surface of the touch screen display 38 is monitored for a touch event (step 210) and, in response to determination of a touch event, the charge at each of the piezoelectric disks 96 is controlled to vary the force applied by the piezo actuator 90 on the touch screen display 38 and cause movement of the touch screen display 38 for simulating the collapse of a dome switch (step 220). The process ends.

It will be appreciated that the flow chart of FIG. 6 is simplified for the purpose of explanation. A further touch event may be detected again and the steps may be repeated, for example. Further, the charge at each of the piezoelectric disks 96 may be controlled independently, for example, to vary the force applied by any one or any combination of the piezo actuators 90 to the touch screen display 38 to cause movement of the touch screen display 38 for simulating another collapse of a dome switch prior to the end of the first touch event being detected.

Figure 7:
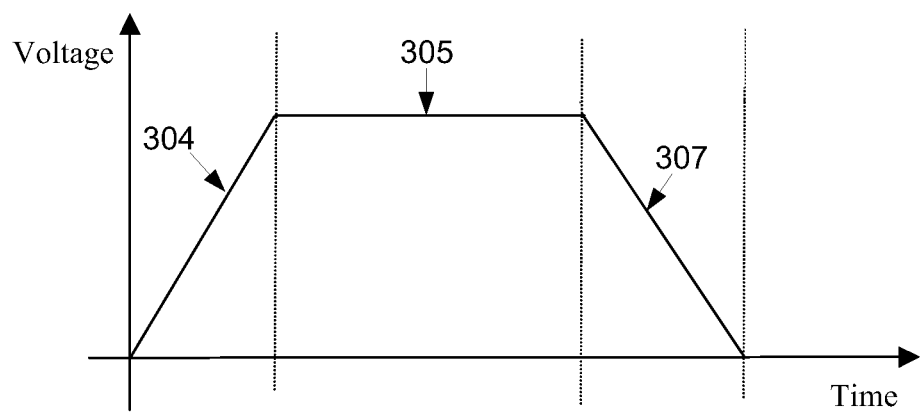
FIG. 7 is a simplified example of a graph of voltage across a piezoelectric disk versus time during operation of the portable electronic device according to one example of the embodiment of FIG. 6.

Continued reference is made to FIG. 6 to describe an example of the method of controlling a portable electronic device in accordance with the present embodiment. Reference is also made to FIG. 7, which shows a simplified example of a graph of voltage across the piezoelectric disk 96 versus time during operation of the portable electronic device 20. It will be appreciated that the voltage is the voltage across one of the piezoelectric disks 96, which is related to the charge at the piezoelectric disk 96. The example shown in FIG. 7 is intended to be illustrative only and is not intended to limit the scope of the present disclosure.

The portable electronic device 20 is in an on or awake state. In the on or awake state, user-selectable features are rendered on the touch screen display 38. Such user-selectable features can include, for example, icons for selection of an application for execution by the processor 22, buttons for selection of user options, keys of a virtual keyboard, keypad or any other suitable user-selectable icons or buttons.

A force on the touch screen display 38 is detected through the force sensors 104, as a result of a change in resistance. The force is determined at the microprocessor 110 from the signals from the amplifier and four-channel analog to digital converter 112 connected to each of the force sensors 104. Thus, the touch screen display 38 is monitored for a touch event and a touch event on the touch screen display 38 is detected. Such a touch event can be determined upon determination of an external applied force as a result of a user touch at the touch screen display 38 for selection of, for example, an Internet browser application, an email application, a calendar application, or any other suitable application, option, or other feature within an application (step 210). For the purpose of the present example, the touch event is detected when the force measured at the force sensors 104 exceeds a minimum threshold force. Thus, the measured force at the force sensors 104 is compared to a threshold force and a touch event is detected if the measured force is determined to exceed the threshold force. Conversely, a touch event is not detected as a result of a relatively light touch or brush on the touch screen display 38 with a measured force that is lower than the threshold force. It will be appreciated that the touch-sensitive input surface 34 is thereby monitored for a touch event. A touch event may be detected if the measured force at each of the force sensors 104 exceeds the threshold force or if the force at any one of the force sensors 104 exceeds the threshold force, or if an average of the force at the four force sensors 104 exceeds the threshold force.

Between the time that the threshold force is exceeded at step 210 and varying the charge at the piezo actuators 90, there may be a slight time delay. In the present embodiment, the delay is due only to the short time period for communication between the force sensors 104, the four-channel amplifier and analog-to-digital converter 112, the microprocessor 110, the piezo driver 108, and the piezoelectric disks 96. In other embodiments, a further delay may be added to provide a different feel for the user.

In response to detection of the touch event at step 210, a suitable current is applied to each piezo actuator 90, ramping up the charge over a period of time causing a bending force on each piezo actuator 90 and a resulting force applied to the touch screen display 38 through the support tray 84. The force applied by each piezo actuator 90 is in the same direction, substantially perpendicularly away from the base 82, and each piezo actuator 90 applies the force to the touch screen display 38 in the same direction each time a force is applied. FIG. 7 shows a voltage increase over time at the line on the graph indicated by the numeral 304, as a result of applied current to charge each piezoelectric disk 96. The portion of the graph indicated by the numeral 304 is shown as a straight line. It is not necessary that the line be straight, however, as the ramp-up may take any suitable shape. The time of charge may be from about 100 μs to about 50 ms, for example. A charge time of about 10 ms to about 50 ms is difficult for a user to perceive when touching the touch screen display 38.

The voltage may be held as shown in the portion of the graph indicated by the numeral 305 to hold the charge or provide a delay prior to discharge. The delay may be, for example, in the range of about 10 ns to about 50 ms.

Next, the electrical charge is reduced by a suitable controlled discharge current and the resulting force applied by the piezo actuator 90 on the touch screen display 38 is reduced over a period of time (step 220). The voltage decreases over time at the line on the graph indicated by the numeral 307, as a result of a suitable discharge current applied to each piezoelectric disk 96. The portion of the graph indicated by the numeral 307 is shown as being a straight line. It is not necessary that the line be straight, however, as the discharge may take any suitable shape. The time of discharge may be from about 100 μs to about 50 ms, for example. A charge time in the range of about 100 μs to about 10 ms provides a tactile feel simulating collapse of a dome switch for the user touching the touch screen display 38.

The graph shown in FIG. 7 illustrates one charge cycle with a single charge and a single discharge. A single charge cycle simulates a mechanical switch response, providing tactile feedback to the user. Although the increase in charge and decrease in charge are represented as being symmetrical in FIG. 7, the increase and decrease need not be symmetrical. The charge may be ramped up over a period of time so that the user does not detect the force applied by the piezo actuators 90 on the touch screen display 38. The electrical charge may be reduced by a suitable controlled discharge current and the resulting force applied by the piezo actuator 90 on the touch screen display 38 is reduced over a very short period of time relative to the period of time for ramping up the charge, for simulating depression of a switch, such as a dome switch (step 220). The short period of time, over which the charge is reduced, accentuates the movement simulating the collapse of the dome switch. The peak current for charging the piezoelectric disks 96 can be lower since the piezoelectric disks 96 are capacitors and therefore the slower the charge is applied, the lower the current that is required. This permits the use of smaller size and lower cost electronics.

The charge and discharge currents applied to the piezoelectric disk 96 are therefore controlled to vary the force from the piezo actuators 90 on the touch screen display 38 for providing a desirable tactile feedback by simulating depression or collapse of a switch, such as a dome switch, in response to detection of the touch event and by simulating release of a switch upon detection of an end of the touch event.

Figure 8:
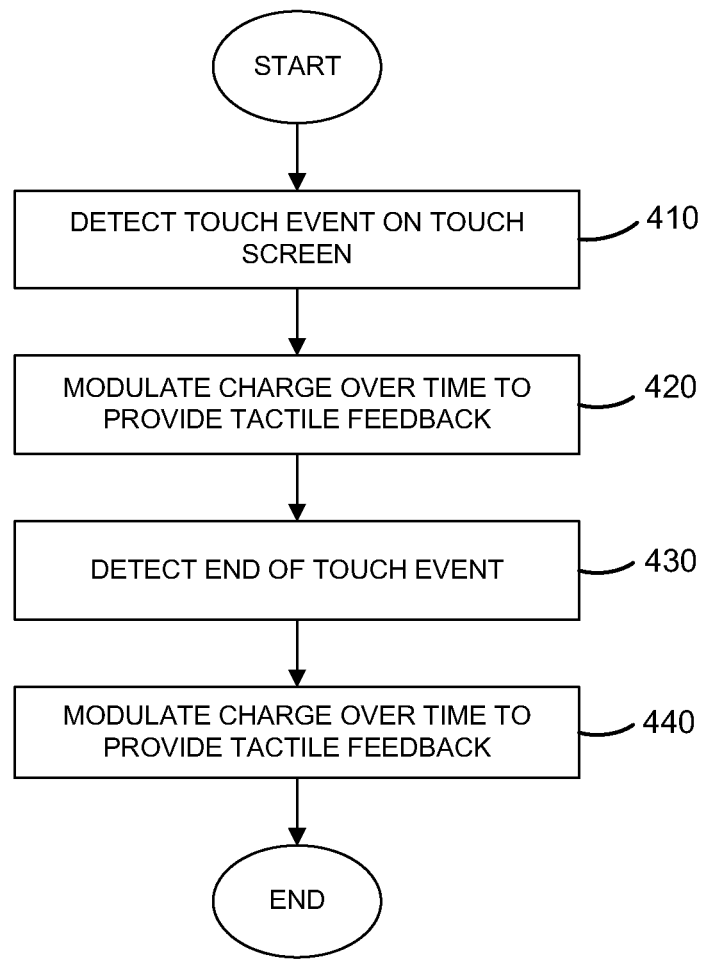
FIG. 8 is a flow chart illustrating a method of controlling a portable electronic device including a touch-sensitive input surface according to another embodiment.

Referring to FIG. 8, there is shown a method of controlling a portable electronic device in accordance with another embodiment. It will be appreciated that the steps of FIG. 8 can be carried out by routines or subroutines of software executed by, for example, the microprocessor 110. Coding of software for carrying out such steps is well within the scope of a person of ordinary skill in the art having regard to the present description.

With the portable electronic device 20 in an on or awake state, the touch screen display 38 is monitored for a touch event (step 410) and, in response to determination of a touch event, the charge at each of the piezoelectric disks 96 is controlled to vary the force applied by the piezo actuator 90 on the touch screen display 38 to cause movement of the touch screen display 38 for simulating the collapse of a dome switch (step 420). When the end of the touch event is detected (step 430), the charge at each of the piezoelectric disks 96 is controlled to vary the force applied by the piezo actuators 90 to the touch screen display 38 to cause movement of the touch screen display 38 for simulating release of a dome switch (step 440). The process ends. The force is applied by the piezo actuators 90 in one direction on the touch-sensitive input surface of the touch screen display 38. The flow chart of FIG. 8 is simplified for the purpose of explanation. A further touch event can be detected again and the steps can be repeated, for example.

Continued reference is made to FIG. 8 to describe an example of the method of controlling a portable electronic device in accordance with the present embodiment. The portable electronic device 20 is in the on or awake state and user-selectable features are rendered on the touch screen display 38. A force on the touch screen display 38 is detected through the force sensors 104 and the force is determined at the microprocessor 110. Thus, the touch screen display 38 is monitored for a touch event and a touch event on the touch screen display 38 may be detected. For the purpose of the present example, the touch event is detected (step 410) when the force measured at the force sensors 104 exceeds a minimum threshold force. Thus, the measured force at the force sensors 104 is compared to a threshold force and a touch event is detected if the measured force is determined to exceed the threshold force. Conversely, a touch event is not detected as a result of a relatively light touch or brush on the touch screen display 38 with a measured force that is lower than the threshold force. The touch-sensitive input surface 34 is thereby monitored for a touch event.

In response to detection of the touch event, a suitable current is applied to the piezo actuator 90, ramping up the charge over a period of time causing flexing of the piezo actuator 90 and a resulting force applied to the touch screen display 38 through the support tray 84. The charge is ramped up over a period of time so that the user does not detect the force applied by the piezo actuators 90 on the touch screen display 38. Next, the electrical charge is reduced by a suitable controlled discharge current and the resulting force applied by the piezo actuator 90 on the touch screen display 38 is reduced over a very short period of time relative to the period of time for ramping up the charge, for simulating collapse of a dome switch (step 420).

Next, the end of the touch event is detected (step 430). When the measured force at the force sensors is reduced to a force below a predetermined force, the end of the touch event is detected. The predetermined force can be lower than the threshold force described above for reducing the chance of false detection of an end of a touch event and successive start of another touch event if the external applied force hovers such that the measured force hovers at about the threshold applied force. A suitable current is applied to the piezo actuator 90, causing an increase in charge, flexing of the piezo actuator 90 and a resulting force applied to the touch screen display 38 through the support tray 84. The current is applied over a relatively short period of time, as compared to the period of time for ramping up the charge, to simulate release of a dome switch (step 440). Next, the electrical charge is reduced and the resulting force applied by the piezo actuator 90 on the touch screen display 38 is reduced by ramping down over a long period of time compared to the period of time for increasing charge to simulate release of a dome switch.

The charge and discharge currents applied to the piezoelectric disk 96 are therefore controlled to vary the force from the piezo actuators 90 on the touch screen display 38 for providing a desirable tactile feedback by simulating collapse of a dome switch in response to detection of the touch event and by simulating release of a dome switch upon detection of an end of the touch event.

Figure 9:
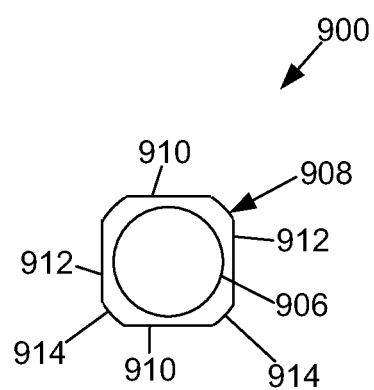
FIG. 9 is a rear view of an example of a piezo actuator according to another embodiment.

FIG. 9 shows a rear view of a piezo actuator 900 in accordance with another embodiment. The piezo actuator 900 includes a piezoelectric disk 906 such as a PZT ceramic disk adhered to a substrate 908. The substrate 908 is a metal disk—that is truncated to provide four sides including two pairs of opposing parallel sides 910, 912 of approximately equivalent length. The sides 910 extend generally perpendicular to the sides 912 and arcuate sections 914 extend between extend between the perpendicular sides 910, 912. The arcuate sections 914 are concentric and are equal in radius. The radius of the arcuate sections 914 is greater than the radius of the piezoelectric disk 906. Further, the width of the substrate 908, between parallel sides 910 and between parallel sides 912, is greater than the diameter of the piezoelectric disk 906 such that an entire side of the piezoelectric disk 906 is adjacent and adhered to the substrate 908. The curved supports (not shown) are sized and shaped to support the piezo actuator 900 between the base and the touch screen display while permitting flexing of the piezo actuator 900.

The piezo actuator 900 may be constructed by truncating the metal disk substrate 908 to provide the opposing parallel sides 910. The metal disk substrate 908 may be truncated utilizing a suitable metalworking process such as blanking or other punching process. The metal disk substrate 908 has a greater diameter than the piezoelectric disk 906. The piezoelectric disk 906 is adhered to the surface of the truncated metal disk substrate 908.

The remaining features of the actuating mechanism 39 and the portable electronic device 20 as well as the operation of the actuating mechanism 39 may be similar to that described above and therefore are not further described herein.

According to one aspect, there is provided an electronic device. The electronic device includes a base, a touch-sensitive input surface spaced from and moveable relative to the base, and an actuating arrangement between the base and the touch-sensitive input surface. The actuating arrangement is arranged to vary a force on the touch-sensitive input surface in response to detection of a touch event on the touch-sensitive input surface. The actuating arrangement includes an actuator including a piezoelectric disk coupled to a substrate that includes an elastically deformable truncated disk.

According to another aspect, a piezo actuator or multiple piezo actuators are provided. Each of the piezo actuators include a piezoelectric disk coupled to a truncated disk substrate. Thus, each piezoelectric disk may be used with a metal substrate disk that is truncated to reduce the metal of the disk. The substrate disk may be truncated on each of two sides of a diameter, reducing the overall footprint of each piezo actuator and increasing the applied force by each piezo actuator on the touch-sensitive input surface. Current or voltage may be applied over a controlled period of time to build up capacitive charge and apply a bending force to the substrate disk on which the piezoelectric disk is adhered, resulting in an increase in applied force on the touch-sensitive input surface. With the substrate disk truncated on each of two sides of the diameter, bending of the substrate disk is less constrained, thereby increasing the force applied to the touch-sensitive input device by comparison to a non-truncated disk substrate. Capacitance may also be discharged over a controlled period of time. The force on the touch-sensitive input surface is therefore controlled to provide tactile feedback for the user in the form of forces opposing an externally applied force (by a user's finger). The force and resulting movement of the touch-sensitive input surface may be controlled to simulate the actuation of a mechanical switch such as a dome switch. Thus, a desired tactile feedback, recognizable by a user, is provided for confirming receipt of input to the user, reducing the chance of input errors such as double entry, decreasing use time and increasing user-satisfaction.

While the embodiments described herein are directed to particular implementations of the portable electronic device and the method of controlling the portable electronic device, it will be understood that modifications and variations may occur to those skilled in the art. All such modifications and variations are believed to be within the sphere and scope of the present disclosure.

What is claimed is:

1. An electronic device comprising:
   a base;
   a touch-sensitive input surface spaced from and moveable relative to the base; and
   an actuating arrangement between the base and the touch-sensitive input surface and arranged to vary a force on the touch-sensitive input surface in response to detection of a touch event on the touch-sensitive input surface, the actuating arrangement including an actuator comprising a piezoelectric disk coupled to a substrate, the substrate comprising an elastically deformable truncated disk wherein the elastically deformable truncated disk is truncated on each of two sides of a diameter.

2. The electronic device according to claim 1, wherein the substrate comprises a metal substrate.

3. The electronic device according to claim 1, wherein each of two sides of the elastically deformable truncated disk are generally symmetrical.

4. The electronic device according to claim 1, wherein the actuating arrangement comprises a plurality of actuators.

5. The electronic device according to claim 4, wherein each of the actuators is disposed near a respective corner of the touch-sensitive input surface.

6. The electronic device according to claim 1, wherein the force is applied by the at least one actuator in a single direction on the touch-sensitive input surface.

7. The electronic device according to claim 1, comprising at least one force sensor disposed between the base and the touch-sensitive input surface for detecting an externally applied force on the touch-sensitive input surface.

8. The electronic device according to claim 1, comprising a display on which the touch-sensitive input surface is disposed, thereby providing a touch screen display.

9. The electronic device according to claim 1, wherein the actuating arrangement comprises a memory and a microprocessor coupled to the memory to execute computer-readable code stored in the memory to vary a charge at the actuator and thereby control the force on the touch-sensitive input surface.

10. The electronic device according to claim 9, comprising a processor connected to the touch-sensitive input surface and the microprocessor of the actuating arrangement.

* * * * *